US010050278B2

(12) United States Patent
Yom et al.

(10) Patent No.: US 10,050,278 B2
(45) Date of Patent: Aug. 14, 2018

(54) FUEL CELL ELECTRODE HAVING NITROGEN-DOPED GRAPHENE AND PASSAGE CHANNEL

(71) Applicants: Typher Yom, Manhasset, NY (US); Jong Won Yom, Manhasset, NY (US)

(72) Inventors: Typher Yom, Manhasset, NY (US); Jong Won Yom, Manhasset, NY (US)

(*) Notice: Subject to any disclaimer, the term of this patent is extended or adjusted under 35 U.S.C. 154(b) by 254 days.

(21) Appl. No.: 14/978,740

(22) Filed: Dec. 22, 2015

(65) Prior Publication Data

US 2016/0111731 A1 Apr. 21, 2016

Related U.S. Application Data

(63) Continuation-in-part of application No. 14/563,468, filed on Dec. 8, 2014, now abandoned.

(60) Provisional application No. 62/057,006, filed on Sep. 29, 2014.

(51) Int. Cl.

| H01M 4/02 | (2006.01) |
| H01M 4/86 | (2006.01) |
| H01M 4/90 | (2006.01) |
| H01M 4/88 | (2006.01) |
| H01M 8/0234 | (2016.01) |
| H01M 8/0236 | (2016.01) |
| H01M 8/0245 | (2016.01) |
| H01M 12/08 | (2006.01) |
| H01M 8/1018 | (2016.01) |

(52) U.S. Cl.
CPC ....... *H01M 4/8626* (2013.01); *H01M 4/8605* (2013.01); *H01M 4/8642* (2013.01); *H01M 4/8657* (2013.01); *H01M 4/8846* (2013.01); *H01M 4/8867* (2013.01); *H01M 4/9083* (2013.01); *H01M 8/0234* (2013.01); *H01M 8/0236* (2013.01); *H01M 8/0245* (2013.01); *H01M 12/08* (2013.01); *H01M 2004/8689* (2013.01); *H01M 2008/1095* (2013.01); *Y02E 60/128* (2013.01)

(58) Field of Classification Search
CPC ............. H01M 4/9083; H01M 4/8846; H01M 4/8867; H01M 4/8605; H01M 4/8626; H01M 2004/8689
See application file for complete search history.

(56) References Cited

U.S. PATENT DOCUMENTS

| 2010/0288636 A1* | 11/2010 | Sone | ................. G01N 33/0037 204/424 |
| 2012/0049126 A1* | 3/2012 | Park | ..................... C04B 35/447 252/506 |
| 2013/0273246 A1* | 10/2013 | Chisholm | ............... C23C 16/18 427/212 |
| 2014/0050995 A1 | 2/2014 | Dai | |

* cited by examiner

*Primary Examiner* — Raymond Alejandro (57) ABSTRACT

A fuel cell electrode includes a substrate having a first surface and a second surface, a passage channel connecting the first surface and the second surface, and a nitrogen-doped graphene layer disposed within the passage channel. The passage channel is formed of a plurality of pores connected to each other.

15 Claims, 10 Drawing Sheets

FUEL CELL ELECTRODE HAVING NITROGEN-DOPED GRAPHENE AND PASSAGE CHANNEL

CROSS-REFERENCE TO RELATED APPLICATION

This application is a Continuation-In-Part of U.S. patent application Ser. No. 15/563,468 which was filed on Dec. 8, 2014 and was abandoned, and claims the priority of U.S. Provisional Application No. 62/057,006 filed Sep. 29, 2014, the disclosure of which is incorporated herein by reference in its entirety.

FIELD OF THE INVENTION

The present invention relates to cathode devices and fuel cells equipped with same.

BACKGROUND OF THE INVENTION

Various fuel cells have been developed in the past. Such fuel cells are equipped with electrodes to performing chemical reactions to generate electricity.

SUMMARY OF THE INVENTION

In accordance with an exemplary embodiment, a fuel cell electrode includes a substrate, a passage channel and a nitrogen-doped graphene layer. The substrate has a first surface and a second surface. A passage channel connects the first surface and the second surface. The passage channel is formed of a plurality of pores connected to each other. The nitrogen-doped graphene layer is disposed within the passage channel.

In accordance with an exemplary embodiment, a fuel cell includes an anode electrode, a cathode electrode, and an electrolyte interposed between the anode electrode and the cathode electrode. The cathode electrode includes a substrate, a passage channel and a nitrogen-doped graphene layer. The substrate has a first surface and a second surface. The first surface is in contact with the electrolyte. The passage channel connects the first surface and the second surface. The passage channel is formed of a plurality of pores connected to each other. The nitrogen-doped graphene layer is disposed within the passage channel.

In accordance with an exemplary embodiment of the present invention, a cathode device includes a porous substrate. Nitrogen-doped graphene is contained in or infused with the substrate. According to an exemplary embodiment, the present invention provides an electrode for a fuel cell containing the cathode device for carrying out a half-cell reaction, which is facilitated by the nitrogen-doped graphene.

In accordance with an exemplary embodiment, a method of making a cathode device includes the steps of providing a porous substrate and forming a nitrogen-doped graphene layer or layers in and/or on the substrate.

BRIEF DESCRIPTION OF THE DRAWINGS

For a more complete understanding of the present invention, reference is made to the following detailed description of the invention considered in conjunction with the accompanying drawings, in which.

DETAILED DESCRIPTION OF THE INVENTION

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; exemplary embodiments are provided merely to be illustrative. Among other things, for example, subject matter may be embodied as methods, devices, components, combinations or systems. The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Moreover, directional and positional phrases, such as "upper", "lower", "lateral", "bottom", "top", "front", "rear", "downwardly", "upwardly", "laterally", "axially", etc., are used herein for illustration purposes only and should not be construed as limiting the scope of the present invention.

Although the present invention can be used in conjunction with any type of fuel cell, it is particularly suitable for use in connection with a metal-air fuel cell. Accordingly, the present invention will be described hereinafter in connection with such a fuel cell. It should be understood, however, that the following description is only meant to be illustrative of the present invention and is not meant to limit the scope of the present invention, which has applicability to other fuel cells, including polymer electrolyte membrane (PEM) fuel cells.

Figure 1:
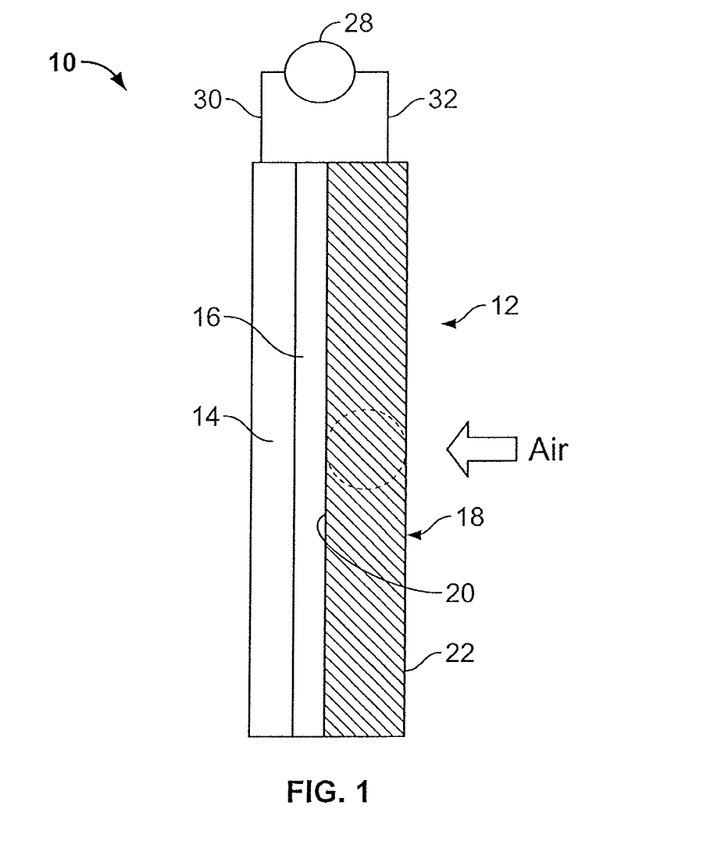
FIG. 1 is a schematic view of a fuel cell having a cathode constructed in accordance with an embodiment of the present invention.
Figure 1A:
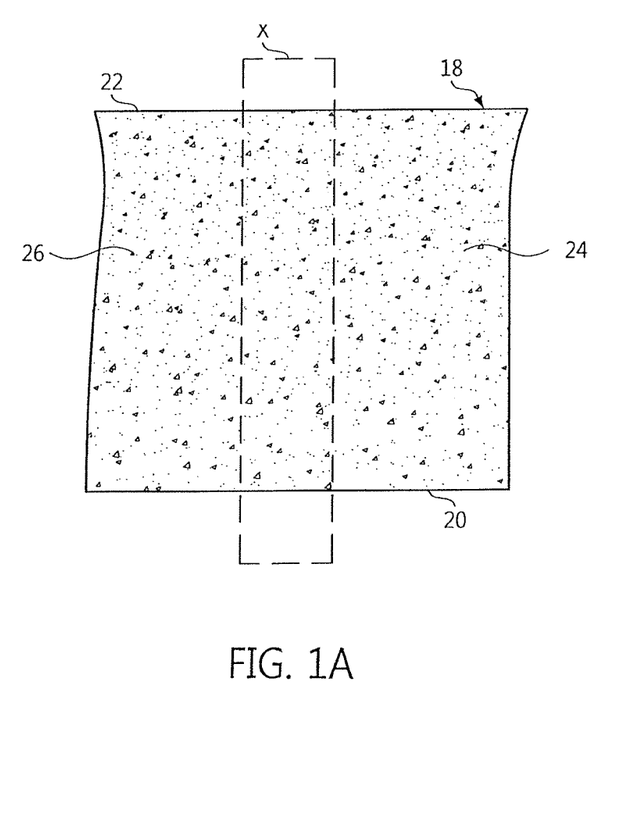
FIG. 1A is an enlarged view of a section of the cathode shown in FIG. 1.

FIG. 1 schematically illustrates a fuel cell 10 constructed in accordance with an embodiment of the present invention. The fuel cell 10 includes a cathode 12 and an anode 14 for carrying out respective half-cell reactions for generating electricity. An electrolyte 16 is located between, and in contact with, the cathode 12 and the anode 14. The electrolyte 16 is selected from any electrolyte used in conventional fuel cells for transmitting protons and/or ions from the anode 14 to cathode 12. In an exemplary embodiment, the electrolyte 16 includes a phosphoric acid and/or potassium hydroxide solution. In an exemplary embodiment, water may be used as the electrolyte 16.

Figure 1B:
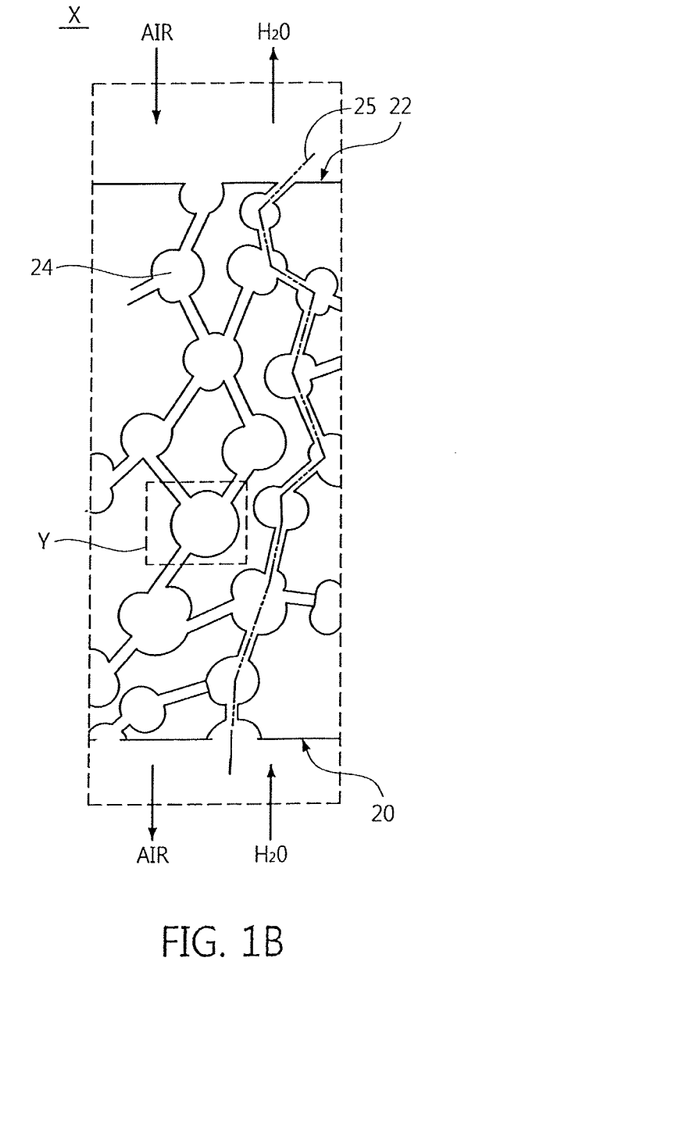
FIG. 1B shows a plurality of pores disposed in a substrate in accordance with an embodiment of the present invention.
Figure 1C:
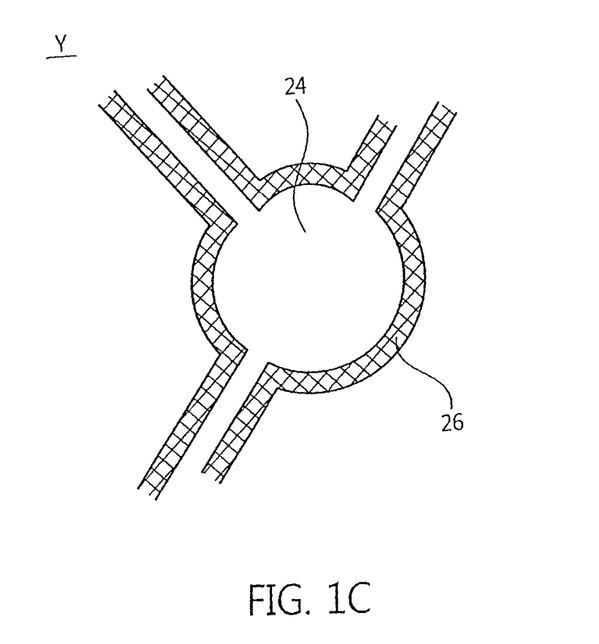
FIG. 1C shows a graphene layer disposed in a pore in accordance with an embodiment of the present invention.

Now referring to FIGS. 1, 1A through 1D, the cathode 12 includes a porous substrate or matrix 18 having an inner side 20 adjacent the anode 14 and an outer side 22 opposite the anode 14. The matrix 18 contains a plurality of interior pores 24, which are interconnected to each other to form a passage channel 25, as shown in FIG. 1B, connecting the inner side 20 and the outer side 22, such that it is permeable by fuel sources and ions (e.g., water and elemental oxygen, protons and/or electrons). The matrix 18 is infused with nitrogen-doped ("n-doped") graphene to provide reactive sites therein for carrying out a half-cell reaction. (See, FIG. 1C). In an exemplary embodiment, n-doped graphene is infused substantially throughout the matrix 18 and retained in the interior pores 24 to form the n-doped graphene layer 26 which may serve to catalyze the half-cell reaction. For instance, the n-doped graphene layer 26 may be formed on an inside the interior pores 24, as shown in FIG. 1C, along the passage channel 25. For instance, the concentration of the n-doped graphene 26 is substantially the same throughout the matrix 18. In an exemplary embodiment, such concentration may change within the matrix 18. In an exemplary embodiment, the n-doped graphene layer 26 are infused with the matrix 18 such that their concentration is higher adjacent the outer side 22 of the matrix 18 and gradually decreases towards the inner side 20 (see, e.g., FIG. 1A).

The n-doped graphene layer 26 is formed along the passage channel 25 of the matrix 18 so that a cathode-side half-cell reaction occurs in or within the cathode 12. In an exemplary embodiment, the n-doped graphene layer 26 catalyze the cathode-side half-cell reaction. The n-doped graphene layer 26 may catalyze an oxygen reduction reaction (ORR) through which elemental oxygen, protons and electrons combine to form water (e.g., $O_2+4H^++4e^- \rightarrow 2H_2O$).

Figure 1D:
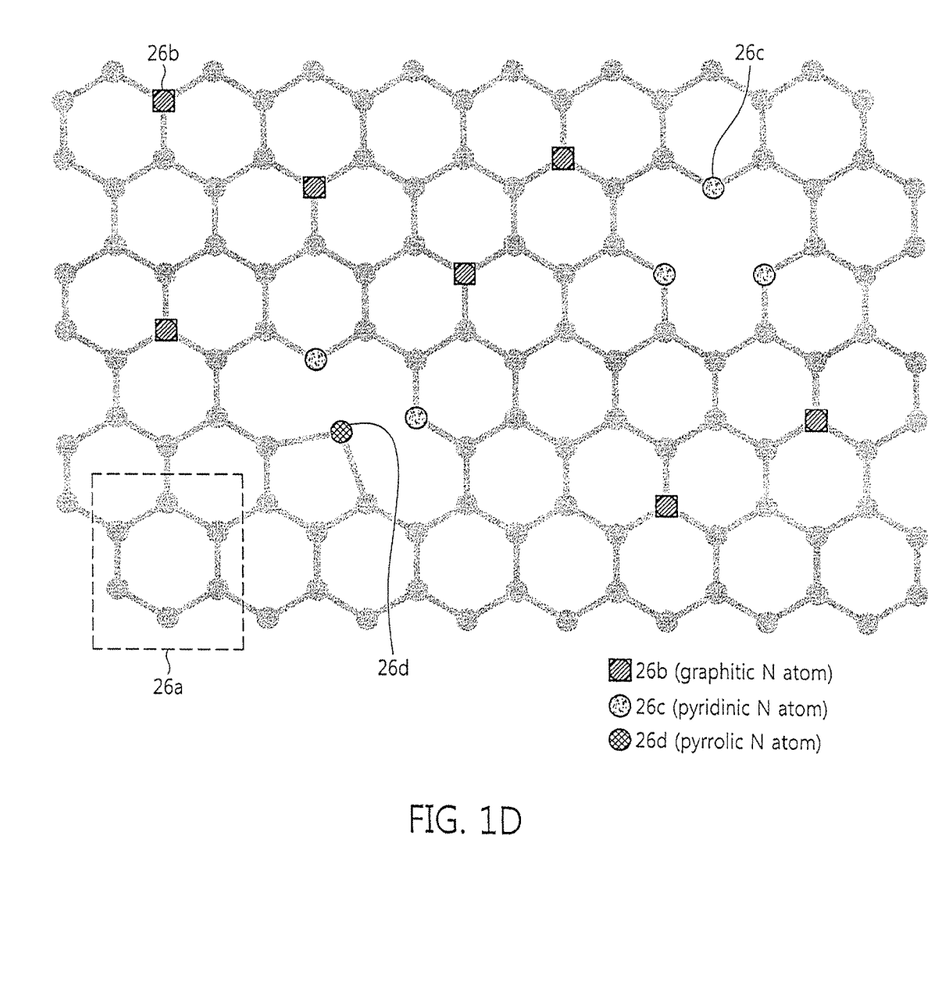
FIG. 1D shows an atomic structure of a graphene layer in accordance with an embodiment of the present invention.

Referring to FIG. 1D, the nitrogen atoms may cause the graphene layer 26 to catalyze the oxygen reduction reaction. The graphene layer 26 is formed of a six-member carbon ring structure 26a. If nitrogen atoms are infused into the graphene layer 26, the nitrogen atoms may replace carbon atoms of the six-member carbon ring structures 26a. The nitrogen atoms which replace a carbon in the graphene layer 26 may be referred to as a graphitic N atom 26b, a pyridinic N atom 26c or a pyrrolic N atom 26d, depending on the manner in which a carbon atom of the graphene layer 26 is replaced with an N atom. For example, a graphitic N atom 26b may indicate to an N atom which substitutes a carbon atom in a six-member carbon ring structure of graphene; a pyridinic N atom 26c may indicate to an N atom which substitutes a carbon, creating a defective site in the graphene; and a pyrrolic N atom 26d may indicate to an N atom which substitutes a carbon, creating a defective site in the graphene and breaking the six-member carbon ring structure into four carbon member and one nitrogen structure. In an exemplary embodiment, the pyrrolic N atom 26d may provide more reactive catalytic sites for the oxygen reduction reaction than the pyridinic N atom 26c and the graphitic N atom 26b. In an exemplary embodiment, the pyridinic N atom 26c may provide more reactive catalytic site for the oxygen reduction reaction The present invention is not limited thereto. For example, the alkaline four-electron pathway (i.e., $O_2+2H_2O+4e^- \rightarrow 4OH^-$) and the acidic two-electron pathway (i.e., $O_2+2H^++2e^- \rightarrow H_2O_2$) may occur, depending on fuel sources, electrolytes, electrode materials and/or other variables.

In an exemplary embodiment, the n-doped graphene layer 26 is formed in the passage channel of the matrix 18 in layer form (e.g., in layers) and/or is coated over the matrix 18. In an exemplary embodiment, the n-doped graphene 26 coats at least some of the pores 24 of the matrix 18, creating a three-dimensional coating/layer or coatings or layers of n-doped graphene within the matrix 18 and allowing the overlapping of nitrogen atoms in different layers of graphene. The coating of the n-doped graphene 26 creates an inner lining of n-doped graphene in the areas of the matrix 18 that form the pores 24. The oxygen molecules, which can enter into the pores 24, are attracted to the nitrogen in the n-doped graphene 26 at multiple angles, while some water (and protons) moves into the pores via capillary action, coming into contact with the oxygen. The electrons follow because the n-doped graphene is electrically conductive, allowing for the ORR to occur efficiently.

Still referring to FIG. 1, the outer side 22 of the cathode 12 is exposed such that fuel sources (e.g., air containing oxygen and/or water) can be supplied to the cathode 12. For instance, the cathode 12 is open to the air, i.e., open to the ambient environment, such that air can permeate into the matrix 18 through its interior pores 24. In an exemplary embodiment, the cathode 12 may include an air inlet port and an air outlet port spaced from each other for delivering a constant stream of air or other gas (i.e., pure oxygen, etc.) to the matrix 18.

As discussed above, the cathode 12 is constructed so as to facilitate delivery of fuel sources (e.g., air, oxygen, etc.) to the interior pores 24 of the matrix 18. More particularly, the matrix 18 is made from a porous material having a porosity sufficient to allow fuel sources to penetrate into and/or throughout the interior pores 24 and/or resulting waste chemicals (e.g., water) to be discharged therefrom. In other embodiments, the porous material may be rigid, electrically non-conductive, thermally conductive and/or wettable (e.g., liquid, such as water, can permeate into and/or throughout the matrix 18). In an exemplary embodiment, the matrix 18 is constructed such that the n-doped graphene 26 and/or liquid can be retained within the interior pores 24. The matrix material is selected from materials capable of providing an environment in which a cathode-side half-cell reaction can be carried out. In an exemplary embodiment, the porous material includes silicon carbide, aluminum oxide, paper and/or other suitably permeable materials. In an exemplary embodiment, the porous material includes silicon carbide having a grit size of about 220. In other embodiments, the matrix 18 may include porous substrates of silicon carbide and/or aluminum oxide having different grit sizes.

Referring back to FIG. 1, the anode 14 is constructed in a conventional manner. Accordingly, the anode 14 can be made from any material used in constructing conventional anodes used in metal-air fuel cells. In an exemplary embodiment, the anode 14 is a metal strip made from aluminum, iron, copper, silver and/or gold. In other embodiments the anode 14 may be formed of any metal that can react with the cathode 12. A half-cell reaction is carried out by the anode 14 such that the anode 14 is broken down into ions (e.g. positive metal ions and electrons). The electrons generated from this reaction are transmitted to a load 28 (e.g., an electrically powered device, or electrical storage device, such as a battery) via an electrical lead 30. The load 28 is electrically connected to the cathode 12 via an electrical lead 32 such that the electrons can be transmitted from the load 28 to the cathode 12. Without being bound by any theory, it is believed that ambient protons from the electrolyte 16 and the electrons from the anode half-reaction combine with oxygen at the cathode 12, generating water as a waste material which is discharged from cathode 12 via the interior pores 24.

Figure 2A:
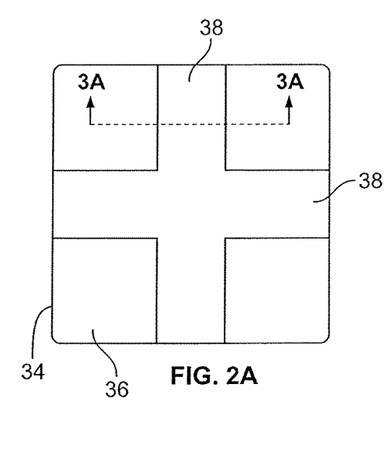
FIG. 2A is a top view of a porous matrix with graphite lines drawn thereover during a process for making the cathode shown in FIG. 1.
Figure 2B:
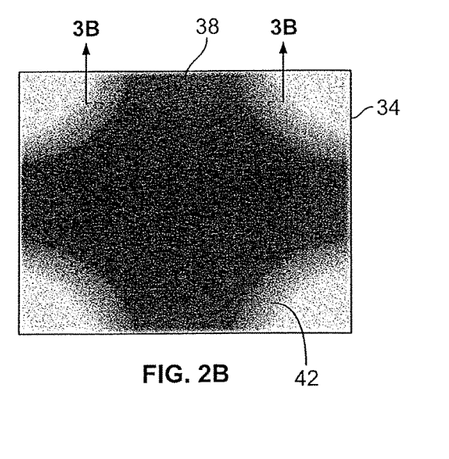
FIG. 2B is a top view of the porous matrix shown in FIG. 2A after the spreading or smearing of the graphite lines.

The cathode 12 of the present invention can be made by performing a nitrogen-doping process on the matrix 18 after the matrix 18 has been infused with graphene oxide. With reference to FIG. 2A, a suitable substrate 34 is selected as the starting material for the matrix 18. The substrate 34 can be of a desired size, shape and/or material based on various criteria, such as porosity, pore sizes, length, thermal conductivity, wettability, cost and/or availability. In an exemplary embodiment, the substrate 34 has a thickness ranging from about 10 mm to about 12 mm. In other embodiments, the substrate 34 may be provided with a different thickness. The substrate 34 may be generally square or rectangular in shape. However, the substrate 34 can be in any shape, so long as a sufficient surface area is provided for the coating of graphite and graphene oxide to create reactive sites sufficient for carrying out a half-cell reaction in the cathode 12. In an exemplary embodiment, the substrate 34 is made from silicon carbide, aluminum oxide, paper and/or other suitable materials (e.g., SUN TIGER silicon carbide substrates having part number GC220).

Figure 3A:
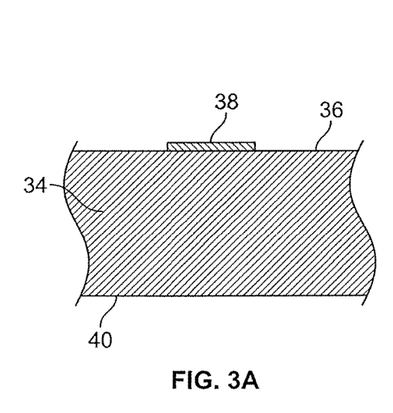
FIG. 3A is a cross-sectional view of a portion of the porous matrix shown in FIG. 2A.

After a suitable starting substrate 34 has been selected, made, sized and/or shaped, graphite is applied to a surface 36 of the substrate 34 to form a plurality of graphite lines or patterns 38 on the substrate 34 (see FIGS. 2A and 3A). Other electrically conductive materials, such as metals, may be used. In an exemplary embodiment, the graphite lines 38 are drawn on the surface 36 with a standard conventional lead pencil, such as DIXON TICONDEROGA lead pencils sold by Dixon Ticonderoga Co., Heathrow, Fla. In an exemplary embodiment, the graphite lines 38 may be sprayed or otherwise applied to the surface 38 of the substrate 34 according to a conventional method known in the art. In an exemplary embodiment, graphite can be applied to an opposite surface 40 of the substrate 34 (in addition to the surface 36) in a similar manner.

Figure 6:
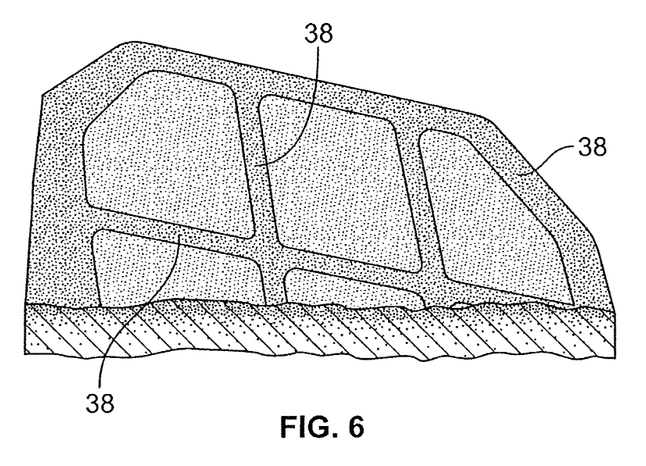
FIG. 6 is a partial view showing a cathode constructed in accordance with an exemplary embodiment of the present invention.

The graphite lines 38 can be in any suitable patterns, sizes and/or shapes. In an exemplary embodiment, the graphite lines 38 are provided with a sufficient width, forming a cross pattern (see FIG. 2A). In an exemplary embodiment, the graphite lines 38 may include graphite lines drawn or applied along the outer edges of the substrate 34 (see FIG. 6). In an exemplary embodiment, the entire surface 36 of the substrate 34 may be applied with a layer or layers of graphite.

Figure 3B:
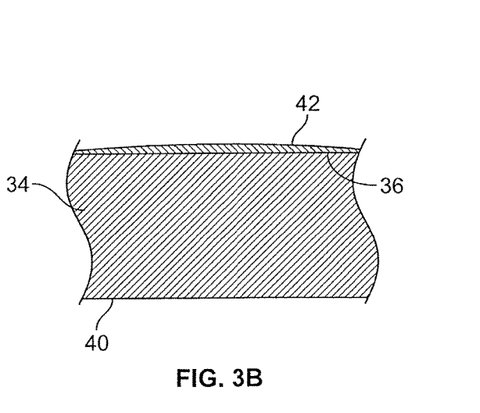
FIG. 3B is a cross-sectional view of a portion of the porous matrix shown in FIG. 2B.

After the graphite lines 38 are formed on the substrate 34, graphite particles in the graphite lines 38 are distributed or spread over substantially the entire surface 36 of the substrate 34 so as to form a graphite layer 42 substantially covering the substrate 34 (see FIGS. 2A and 3B). In an exemplary embodiment, such distribution may be performed mechanically by spreading or smearing the graphite lines 38 over the surface 36 of the substrate 34 with a smooth object such as, for instance, vinyl, rubber or other suitable material known in the art. Once the graphite layer 42 is formed, the substrate 34 is saturated with water. In an exemplary embodiment, distilled water, deionized water or another conventional type of water is utilized. The saturation may be carried out in any suitable conventional container or by other means known in the art. For instance, water may be sprayed, dropped and/or gently poured onto the graphite layer 42.

Figure 2C:
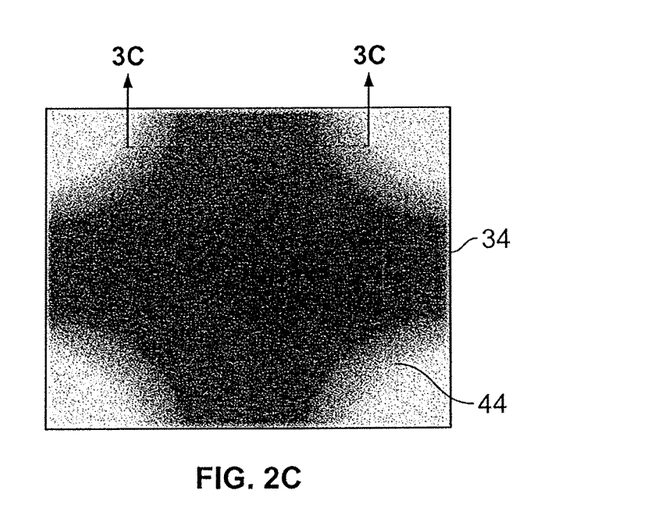
FIG. 2C is a top view of the porous matrix shown in FIG. 2B after the application of an aqueous solution of graphene oxide.
Figure 3C:
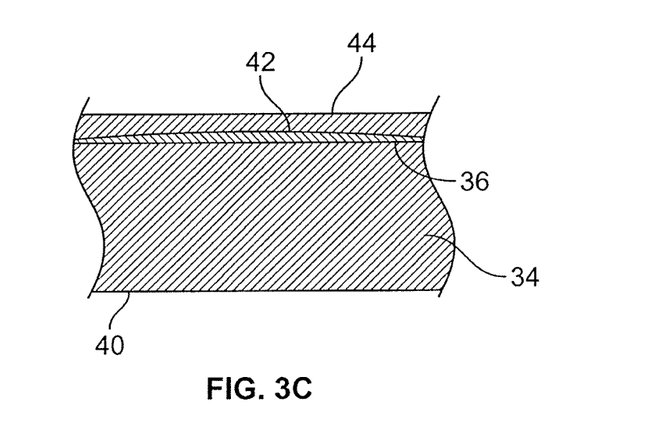
FIG. 3C is a cross-sectional view of a portion of the porous matrix shown in FIG. 2C.

Once the substrate 34 is sufficiently saturated with water, an aqueous solution containing graphene oxide is applied to or coated over the surface 36 of the substrate 34 (see FIGS. 2C and 3C). In an exemplary embodiment, the graphene oxide and water can be mixed together to form the solution having a graphene oxide concentration ranging from about 0.5 mg/ml to about 6 mg/ml. In an exemplary embodiment, other graphene oxide concentrations can be used. In an exemplary embodiment, the graphene oxide solution can be applied to both surfaces of the substrate 34 (i.e., the surface 36 containing the graphite layer 42 and the opposite surface 40). The graphene oxide solution can be applied to the substrate 34 in any conventional manner known in the art (e.g., using a conventional roller).

Figure 4:
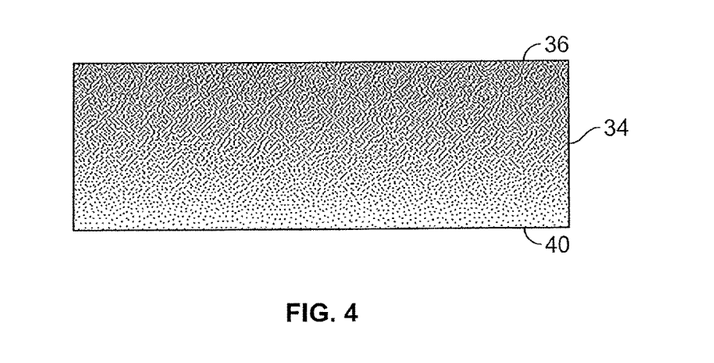
FIG. 4 is a view of the porous matrix, schematically illustrating graphene oxide and/or graphite drawn into the matrix.

Once adequately coated, the graphene oxide layer 44 and graphite layer 42 are drawn into interior pores of the substrate 34. More particularly, an absorbent material (e.g., paper towel, sponge, etc.) is applied to a side of the substrate 34 opposite from the graphene oxide layer 44 and/or the graphite layer 42. In the example shown in FIG. 3C, the absorbent material is applied to the surface 40 of the substrate 34. As moisture is withdrawn from the substrate 34 into the absorbent material, a suction or "pulling" force acts on graphene oxide and graphite materials in the graphene oxide and graphite layers 44, 42, thereby causing same to be drawn into the interior pores of the substrate 34 and adhere thereto (see, e.g., FIG. 4, which illustrate a higher concentration of graphene oxide and/or graphite adjacent the surface 36 than the surface 40 because the graphene oxide and graphite layers 44, 42 were applied to the surface 36 in this embodiment). As a result, the interior pores of the substrate 34 are coated substantially with graphene oxide and/or graphite materials. In other embodiments, the graphene oxide and graphite materials may be forced into the interior pores of the substrate 34 by a vacuum pump, a press or by other suitable means. Thereafter, the substrate 34 is allowed to dry to remove residual moisture therefrom.

Figure 5:
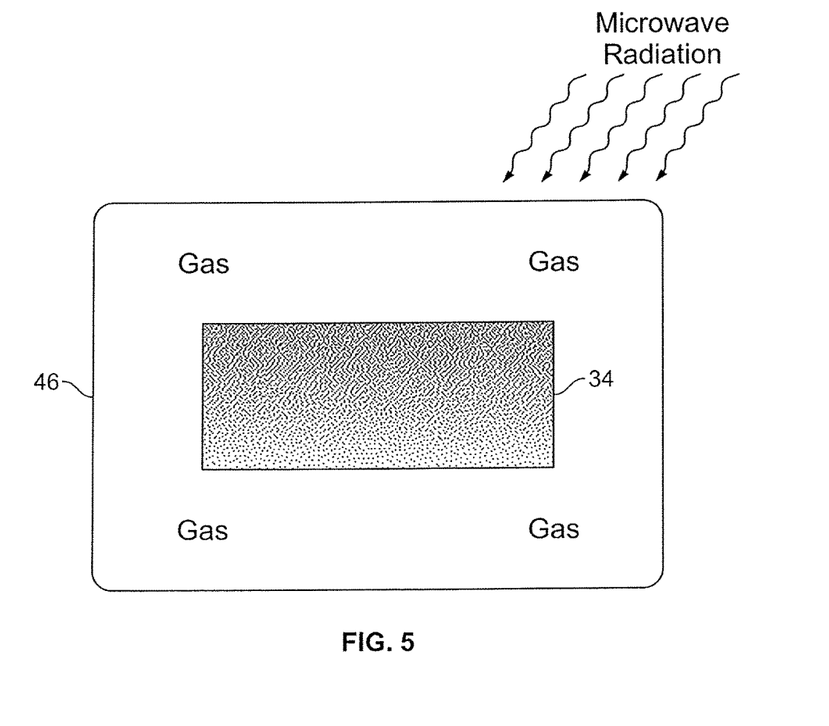
FIG. 5 is a schematic view of a container housing the matrix, which is subjected to microwave radiation in a gas filled environment.

The graphene oxide/graphite coated substrate 34 is then placed in a nitrogen-rich environment (see FIG. 5). In an exemplary embodiment, this is accomplished by placing the substrate 34 in a container 46 made of glass, plastic or other suitable material. The container 46 may either then be filled with a nitrogen-rich gas or may already contain a sufficient amount of nitrogen-rich gas. In an exemplary embodiment, ammonia gas may be used. In other embodiments, the container 46 includes an inlet port (not shown) which provides for the continuous introduction of nitrogen-rich gas.

In order to simultaneously accomplish the reduction and nitrogen doping of the graphene oxide material, the container 46 containing the substrate 34 is subjected to microwave radiation. The microwave radiation interacts with the graphite materials on or within the substrate 34 to produce current surges and the electron blasting phenomena, creating glow discharge ammonia plasma. The ammonia plasma leads to the creation of ammonia gas fumes, which, after cooling, deposit the ammonia gas ions on the graphene oxide materials, thereby simultaneously reducing and n-doping the graphene oxide materials. This process may be repeated until a desired concentration of nitrogen reactive sites is achieved. In an exemplary embodiment, the atomic concentration of nitrogen in the n-doped graphene in the substrate 34 after the completion of the n-doping process can range from about 2 atomic percent (at. %) to about 12 at. %. In an exemplary embodiment, the nitrogen atomic concentration can range from about 2-7.5 at. %. In an exemplary embodiment, the nitrogen atomic concentration can range from about 7 at. % to about 12 at. %. In other embodiments, the formation of the n-dope graphene layers in the substrate 34 may be carried out using other processes, ranging from chemical vapor deposition (CVD) to carbon-nitride immobilization.

In an exemplary embodiment, the container 46 containing the substrate 34 undergoes multiple radiation pulses, whereby the container 46 is subjected to microwave radiation, cooled and subjected to microwave radiation again. In an exemplary embodiment, the container 46 is subjected to microwave radiation for about 3-5 seconds and then cooled for about 15-25 minutes before the cycle is repeated to ensure that the container 34 is not structurally harmed. In a further embodiment, this cycle is repeated 3-10 times until the substrate 34 undergoes a color change from brown to a dark grey or black. The microwave radiation may be supplied by industrial microwave radiation production units, commercial microwave radiation production units, or other suitable microwave radiation production unit.

The process of the present invention allows the n-doped graphene particles 26 to be formed and infused substantially throughout the pores 24 of the matrix 18. Because of the large number of pores 24, the n-doped graphene particles 26 create numerous reactive sites within the cathode 12. The nitrogen active sites in the n-doped graphene act as catalysts for the oxygen reduction reaction, increasing the reaction rate.

It should be noted that the present invention can have numerous modifications and variations. For instance, the cathode 12 may be formed of a non-porous material such as glass or the like. In such an embodiment, graphene oxide is applied via a small tube roller to the glass, which is then attached to a ceramic, stone or other similar conventional material with the graphene oxide-coated side facing the contacted material. The cathode 12 may also be coated with n-doped graphene on any number of sides (i.e., two or more sides) of the cathode 12 with the method as described above. Furthermore, anode 14 may be closed to the environment and charged with a sufficient amount of water or other fluid so as to continue the anode side half-cell reaction. Finally, the fuel cell 10 can be provided with an acidic electrolyte within the matrix 18 such as phosphoric acid.

EXAMPLES

Overview

An n-doped graphene sample coated over porous silicon carbide was fabricated using the coating and doping method discussed above. This sample was used as the cathode with various metals as the anode, with phosphoric acid.

Preparation of Graphene Oxide/Silicon Carbide Samples

On a square of porous silicon carbide (220 grit), graphite was drawn over the edges via pencil lead. This graphite was "smeared" using a smooth object, such as rubber, which can spread the graphite layer, and allowing it to be electrically conductive. Using a plastic roller, graphene oxide (2 mg/mL) was coated over the silicon carbide substrate, which was previously saturated with water. Graphene oxide was drawn into the pores of the silicon carbide through a paper towel. The graphene oxide was subsequently dried and placed in a 100 mL glass syringe.

Production and Transfer of Ammonia Gas 5 mL ammonium hydroxide was put in a 50 mL plastic syringe, which was then covered by a plastic bag and subsequently heated in a microwave oven (900 W) for 5 seconds, to create ammonia gas and water. The ammonia gas was transferred to the 100 mL glass syringe containing the graphene oxide coated over the silicon carbide. Prior to the syringe being capped and sealed, this process was repeated to ensure that the environment contained mostly ammonia gas.

N-Doping Through Microwave Irradiation

In a fume hood, the 100 mL glass syringe holding the graphene oxide coated over silicon carbide was placed in a microwave oven (900 W) and irradiated for 9 seconds. To prevent the potential breakage of the glass syringe and the substrate, the duration was split into 3 second intervals for three times. During the irradiation of the graphene oxide, glow discharge ammonia plasma and heat were produced by the current surges and electron blasting of graphite, which assisted in the reduction and the doping of graphene oxide. After irradiation was completed, fumes began to accumulate in the syringe, and the syringe was cooled in air for twenty minutes. When the fumes disappeared, the procedure was repeated two more times. The reduction and n-doping of the graphene oxide was determined by the color change, from a brownish green to a dark grey color. Finally, the syringe was uncapped in the fume hood and cooled for 20 minutes, and the sample was then removed.

Measurement of the Voltage of the Graphene Cathode and Different Metal Anodes (Different Metal Air Cells)

Figure 7A:
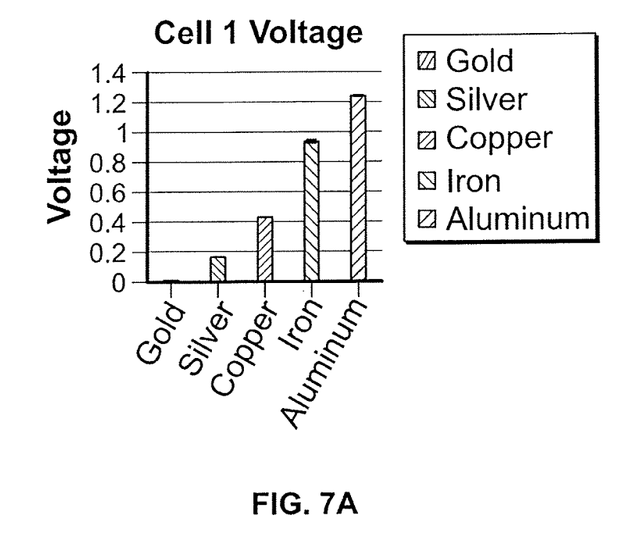
FIGS. 7A and 7B are graphs showing voltage measurements obtained from a sample cathode device made in accordance with an embodiment of the present invention.
Figure 7B:
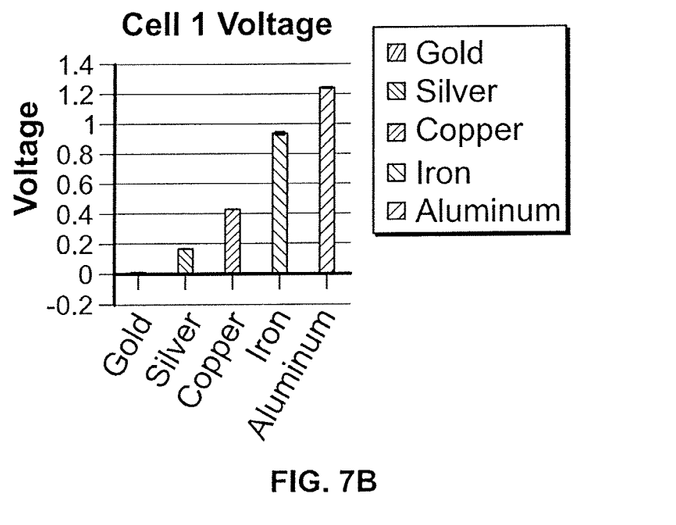

The removed sample was saturated with food-grade 10% phosphoric acid. The cell was placed upright, with the coated sides facing perpendicular to the surface. A small aluminum strip was placed over an uncoated side of the n-doped graphene/silicon carbide sample. Using a multimeter, the probes were connected between the n-doped graphene cathode and the aluminum anode, and the voltage was recorded. The same procedure was repeated with gold, silver, copper, and iron strips as the anode. The voltage measurements observed are shown in FIGS. 7A and 7B. The aluminum strip resulted in approximately 1.2V, the iron strip resulted in approximately 0.9V, the copper strip resulted in approximately 0.4V, the silver strip resulted in approximately 0.08V to approximately 0.16V, and the gold strip resulted in approximately 0.003V to approximately 0V.

It will be understood that the embodiments described herein are merely exemplary and that a person skilled in the art may make many variations and modifications without departing from the spirit and scope of the invention. All such variations and modifications are intended to be included within the scope of the invention, as embodied in the claims presented hereinbelow.

We claim:

1. A fuel cell electrode, comprising:
a substrate having a first surface and a second surface facing the first surface, wherein the substrate is formed of silicon carbide;
a passage channel connecting the first surface and the second surface, wherein the passage channel is formed of a plurality of pores connected to each other; and
a nitrogen-doped graphene layer disposed within the plurality of pores connected to each other to form the passage channel so that the nitrogen-doped graphene layer covers an inside of the passage channel,
wherein an air is received from the second surface of the substrate and an oxygen reduction reaction is catalyzed by the nitrogen-doped graphene layer so that the oxygen reduction reaction generates a byproduct including water or elemental oxygen, and
wherein the byproduct of the oxygen reduction reaction is discharged from the plurality of pores of the passage channel to the first surface.

2. The fuel cell electrode of claim 1, further comprising graphite disposed on the first surface of the substrate.

3. The fuel cell electrode of claim 1, wherein the nitrogen-doped graphene layer is doped with nitrogen atoms.

4. The fuel cell electrode of claim 3, wherein a concentration of the nitrogen atoms is uniform along a direction from the first surface to the second surface.

5. The fuel cell electrode of claim 3, wherein a concentration of the nitrogen atoms is gradually decreasing along a direction from the first surface to the second surface.

6. The fuel cell electrode of claim 1, wherein the nitrogen-doped graphene layer is in contact with an inside of each of the plurality of pores connected to each other to form the passage channel.

7. The fuel cell electrode of claim 1, wherein the nitrogen-doped graphene layer includes a graphitic nitrogen atom, a pyridinic nitrogen atom or a pyrrolic nitrogen atom.

8. A fuel cell, comprising:
an anode electrode;
a cathode electrode;
an electrolyte interposed between the anode electrode and the cathode electrode,
wherein the cathode electrode comprising:
a substrate having a first surface and a second surface facing the first surface, wherein the substrate is formed of silicon carbide, and
wherein the first surface is in contact with the electrolyte;
a passage channel connecting the first surface and the second surface, wherein the passage channel is formed of a plurality of pores connected to each other; and
a nitrogen-doped graphene layer disposed within the plurality of pores connected to each other to form the passage channel so that the nitrogen-doped graphene layer covers an inside of the passage channel,
wherein an air is received from the second surface of the substrate and an oxygen reduction reaction is catalyzed by the nitrogen-doped graphene layer so that the oxygen reduction reaction generates a byproduct including water or elemental oxygen, and
wherein the byproduct of the oxygen reduction reaction is discharged from the plurality of pores of the passage channel to the first surface.

9. The fuel cell of claim 8, wherein the electrolyte includes a phosphoric acid solution, a potassium hydroxide solution or water.

10. The fuel cell of claim 8, wherein the substrate is formed of silicon carbide.

11. The fuel cell of claim 8, wherein the nitrogen-doped graphene layer is in contact with an inside of each of the pores.

12. The fuel cell of claim 8, wherein an oxygen reduction reaction is catalyzed by the nitrogen-doped graphene layer so that the oxygen reduction reaction generates a byproduct including water or elemental oxygen.

13. A fuel cell electrode, comprising:
a substrate having a first surface and a second surface facing the first surface and including a plurality of pores, wherein the substrate is formed of silicon carbide or aluminum oxide;
a passage channel formed of the plurality of pores connected to each other so that the passage channel penetrates the substrate from the first surface to the second surface; and
a nitrogen-doped graphene layer disposed within the plurality of pores of the passage channel so that the nitrogen-doped graphene layer covers an inside of the passage channel,
wherein an air is received from the second surface of the substrate and an oxygen reduction reaction is catalyzed by the nitrogen-doped graphene layer so that the oxygen reduction reaction generates a byproduct including water or elemental oxygen, and
wherein the byproduct of the oxygen reduction reaction is discharged from the plurality of pores of the passage channel to the first surface.

14. The fuel cell electrode of claim 13, further comprising graphite disposed on the first surface of the substrate.

15. The fuel cell electrode of claim 13, wherein the nitrogen-doped graphene layer is doped with nitrogen atoms.

* * * * *